United States Patent
Gupta et al.

(10) Patent No.: US 8,205,087 B2
(45) Date of Patent: Jun. 19, 2012

(54) TOOL FOR DIGITALLY SIGNING MULTIPLE DOCUMENTS

(75) Inventors: Gitika Gupta, Bellevue, WA (US);
Andrew T. Lytle, Kirkland, WA (US);
Bryan J. Reich, Issaquah, WA (US);
Matthew C. Pohle, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1359 days.

(21) Appl. No.: 11/363,585

(22) Filed: Feb. 27, 2006

(65) Prior Publication Data

US 2007/0208943 A1   Sep. 6, 2007

(51) Int. Cl.
*H04L 29/06* (2006.01)

(52) U.S. Cl. .................. 713/176; 713/180

(58) Field of Classification Search ........ 713/165, 713/400, 100, 1, 178, 9, 168, 155–158, 175–176, 713/180; 726/11, 22, 4, 15, 7; 380/25; 709/229, 709/228, 225; 705/76, 64, 12
See application file for complete search history.

(56) References Cited

U.S. PATENT DOCUMENTS

| 7,453 A * | 6/1850 | Scott .......................... 264/334 |
| 5,047,930 A * | 9/1991 | Martens et al. ............ 600/301 |
| 5,455,941 A * | 10/1995 | Okuno et al. ................. 707/9 |
| 5,623,600 A | 4/1997 | Ji et al. |
| 5,689,565 A | 11/1997 | Spies et al. |
| 5,748,960 A | 5/1998 | Fischer |
| 5,951,698 A | 9/1999 | Chen et al. |
| 5,956,481 A | 9/1999 | Walsh et al. |
| 6,006,034 A | 12/1999 | Heath et al. |
| 6,367,012 B1 | 4/2002 | Atkinson et al. |
| 6,434,103 B1 * | 8/2002 | Shitara et al. ................. 369/83 |
| 6,557,054 B2 | 4/2003 | Reisman |
| 6,577,920 B1 | 6/2003 | Hypponen et al. |
| 6,789,156 B1 | 9/2004 | Waldspurger |
| 6,796,489 B2 | 9/2004 | Slater et al. |
| 6,799,206 B1 | 9/2004 | Workman et al. |
| 6,848,048 B1 | 1/2005 | Holmes |
| 6,873,988 B2 | 3/2005 | Herrmann et al. |
| 6,959,382 B1 * | 10/2005 | Kinnis et al. ................. 713/170 |
| 7,028,184 B2 | 4/2006 | Hind et al. |
| 7,055,175 B1 | 5/2006 | Le Pennec et al. |
| 7,093,135 B1 | 8/2006 | Radatti et al. |
| 7,188,186 B1 | 3/2007 | Meyer et al. |
| 7,191,407 B1 | 3/2007 | Klutz et al. |
| 7,203,959 B2 | 4/2007 | Nachenberg et al. |
| 7,210,041 B1 | 4/2007 | Gryaznov et al. |
| 7,216,232 B1 | 5/2007 | Cox et al. |

(Continued)

FOREIGN PATENT DOCUMENTS

EP   1408393   4/2004

OTHER PUBLICATIONS

Office Action mailed Aug. 4, 2009 in U.S. Appl. No. 11/225,706, pp. 1-14.

(Continued)

*Primary Examiner* — Hadi Armouche (57) ABSTRACT

A software tool for digitally signing multiple documents is disclosed. When a user wishes to sign multiple documents containing embedded executable code for purposes of authenticating the code, the user launches this software tool. The user specifies the documents which he or she wishes signed. Thereupon, the tool automatically signs each of the documents and displays the results.

17 Claims, 6 Drawing Sheets

U.S. PATENT DOCUMENTS

| | | |
|---|---|---|
| 7,269,733 B1 * | 9/2007 | O'Toole, Jr. ............... 713/175 |
| 7,290,252 B2 | 10/2007 | Diedrich et al. |
| 7,308,567 B2 * | 12/2007 | Yamamoto et al. ............... 713/1 |
| 7,434,058 B2 | 10/2008 | Ahuja et al. |
| 7,453,472 B2 | 11/2008 | Goede et al. |
| 7,814,328 B1 | 10/2010 | Leonard et al. |
| 2001/0010720 A1 | 8/2001 | Kimball et al. |
| 2001/0034839 A1 | 10/2001 | Karjoth et al. |
| 2002/0002703 A1 | 1/2002 | Baentsch et al. |
| 2002/0004902 A1 | 1/2002 | Toh et al. |
| 2002/0007453 A1 * | 1/2002 | Nemovicher ............... 713/155 |
| 2002/0013910 A1 | 1/2002 | Edery et al. |
| 2002/0023221 A1 | 2/2002 | Miyazaki et al. |
| 2002/0087564 A1 | 7/2002 | Khanna et al. |
| 2002/0087596 A1 | 7/2002 | Lewontin |
| 2002/0099671 A1 * | 7/2002 | Crosbie et al. ............... 705/500 |
| 2002/0112083 A1 * | 8/2002 | Joshi et al. ............... 709/248 |
| 2002/0112161 A1 | 8/2002 | Thomas et al. |
| 2002/0129257 A1 | 9/2002 | Parmelee et al. |
| 2002/0129277 A1 | 9/2002 | Caccavale |
| 2002/0170052 A1 | 11/2002 | Radatti |
| 2003/0009533 A1 * | 1/2003 | Shuster ............... 709/217 |
| 2003/0056102 A1 | 3/2003 | Aho et al. |
| 2003/0088790 A1 | 5/2003 | Kaler et al. |
| 2003/0149581 A1 | 8/2003 | Chaudhri et al. |
| 2003/0212893 A1 | 11/2003 | Hind et al. |
| 2003/0221105 A1 * | 11/2003 | Bajaj ............... 713/176 |
| 2004/0039912 A1 * | 2/2004 | Borrowman et al. ......... 713/176 |
| 2004/0193543 A1 * | 9/2004 | Nord et al. ............... 705/50 |
| 2005/0005101 A1 | 1/2005 | Yenduri |
| 2005/0039018 A1 * | 2/2005 | Wittkotter ............... 713/176 |
| 2005/0050044 A1 | 3/2005 | Takagi et al. |
| 2005/0055686 A1 | 3/2005 | Buban et al. |
| 2005/0063545 A1 | 3/2005 | Fujimoto et al. |
| 2005/0086469 A1 | 4/2005 | Dunagan et al. |
| 2005/0131917 A1 | 6/2005 | Auerbach |
| 2005/0172339 A1 | 8/2005 | Costea et al. |
| 2006/0015940 A1 | 1/2006 | Zamir et al. |
| 2006/0079333 A1 * | 4/2006 | Morrow et al. ............... 463/43 |
| 2006/0143600 A1 | 6/2006 | Cottrell et al. |
| 2006/0167902 A1 | 7/2006 | Bhattacharyay et al. |
| 2006/0206718 A1 | 9/2006 | Frank et al. |
| 2006/0271597 A1 | 11/2006 | Boske |
| 2007/0094710 A1 * | 4/2007 | Walker et al. ............... 726/2 |
| 2007/0208943 A1 | 9/2007 | Gupta et al. |
| 2008/0120710 A1 * | 5/2008 | Holz et al. ............... 726/7 |
| 2008/0128492 A1 * | 6/2008 | Roth et al. ............... 235/380 |
| 2009/0057421 A1 * | 3/2009 | Suorsa et al. ............... 235/494 |

OTHER PUBLICATIONS

Office Action mailed Nov. 18, 2009 in U.S. Appl. No. 11/225,706, pp. 1-15.

Schneier, Bruce, John Wiley & Sons: Applied Cryptography: "Protocols, Algorithms and, Source Code in C", 1996, p. 30.

Office Action mailed Jul. 8, 2009 in U.S. Appl. No. 11/385,139, pp. 1-20.

* cited by examiner

TOOL FOR DIGITALLY SIGNING MULTIPLE DOCUMENTS

BACKGROUND

Documents created, running, and displayed on computers contain user information. For example, spreadsheet documents contain financial information; word processing documents contain alpha-numeric, textual information, presentations can contain image, graphic, chart information, etc. In some cases, application programs enable software to be embedded within the documents. The software runs in the background and is used to execute an explicit programmed set of instructions or commands corresponding to that document. For example, one or more instructions can be executed to create a "shortcut". Rather than individually executing a series of instructions, a user can simply invoke the shortcut which then automatically executes the programmed series of instructions. In this manner, a user can hot-button one or more macros to expeditiously execute functions which would otherwise have to be repeated manually over and over again, each time that function is to be performed. This facilitates the creation, editing, and manipulation of the documents. Another way by which software can be used is for automatically filling out templates or forms. For example, software can read data entered in one field and automatically forward this information so that it is appropriately written to other parts of the document. The information can even be used to fill in the relevant parts of other documents. Moreover, software can be embedded within certain documents to manipulate data or to trigger external events. There are numerous ways by which software can be embedded in documents to achieve desired results or to streamline a business process. Thus, embedding software in documents offer a clear-cut way to improve worker productivity, minimize redundancy, automate, and thereby cut costs.

However, as the software embedded in various documents are created, updated, or otherwise edited, it becomes critical to track the changes so that the corresponding documents contain the latest versions of the embedded software. Otherwise, the software embedded within the documents may become corrupted or obsolete. More ominously, software can be compromised or otherwise hacked by malicious third parties. Each time software is embedded in a document, there is an opportunity for a third party to maliciously exploit that software. Consequently, it is imperative that the embedded software is authenticated to ensure that it is indeed a clean, unadulterated, and most up-to-date version.

One way to ensure the authenticity of software embedded in a document entails attaching a digital signature to the software. A digital signature is used to ensure that the corresponding software has not been changed or edited since the digital signature was created. This significantly minimizes the chances of running any malicious code in the documents and informs users of the effective date of the software.

Presently, embedded software is digitally signed by first launching the application that created the document, opening the document, then launching some type of editor program to actually create and attach the digital signature to the embedded software. With this process, the embedded software has to be individually digitally signed, one at a time. Given that an organization, company, or institution can have thousands upon thousands of documents containing embedded software, it can be quite time consuming and cumbersome to generate digital signatures on an individual basis. Further complicating matters is the fact that a digital certificate is required to digitally sign the embedded software. Due to its sensitive function, the digital certificate is kept in a secure location, and access to the digital certificate might intentionally be limited to a small group of trusted employees. These two factors impede the rate by which software can be digitally signed. Thus, digitally signing software for authentication purposes acts as a bottleneck and impedes the distribution of software embedded within documents.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A software tool designed to digitally sign software embedded in multiple documents is disclosed. A user identifies one or more documents which have embedded software which need to be digitally signed. The software tool accesses a certificate one time for generating a number of digital signatures. The digital signatures are attached to the software. Thus, the software tool enables a user to efficiently, quickly, and effortlessly sign software embedded in a number of different documents by launching a single, cohesive process.

DESCRIPTION OF THE DRAWINGS

The accompanying drawings, which are incorporated in and form a part of this specification, illustrate embodiments discussed below, and, together with the description, serve to explain the principles of a tool for digitally signing multiple documents.

DETAILED DESCRIPTION

Figure 1:
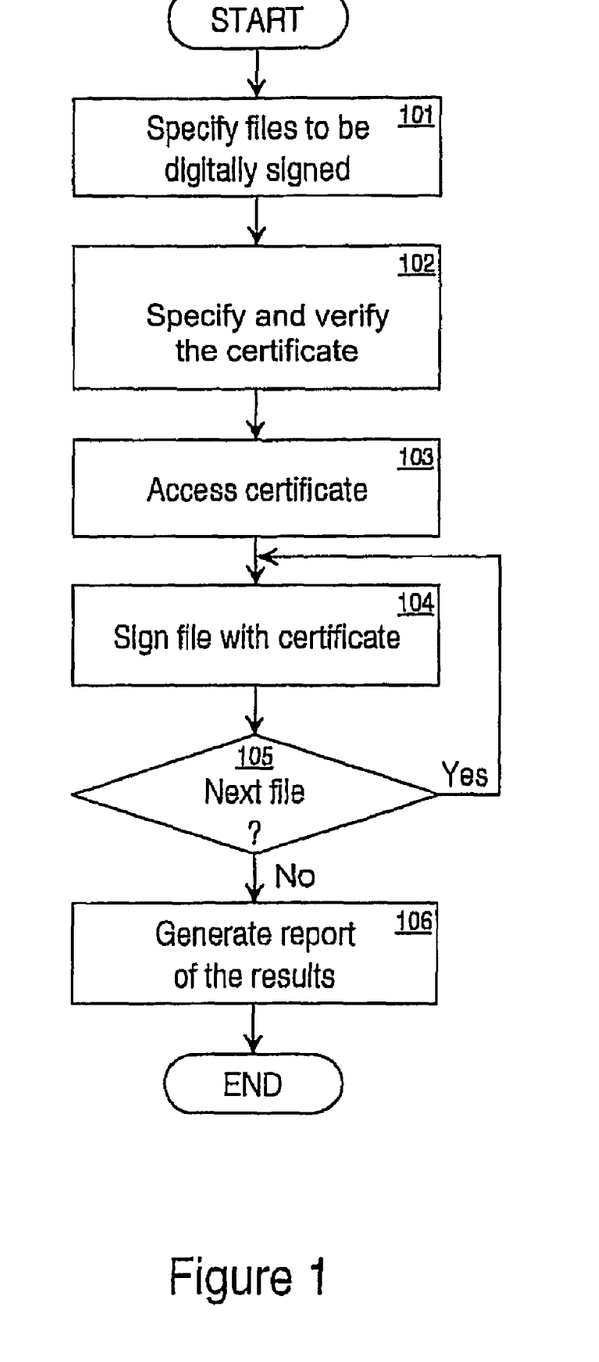
FIG. 1 shows a flowchart of one embodiment of a signing tool.

A software tool for digitally signing any number of documents is described. Referring to FIG. 1, a flowchart of one embodiment of a signing tool is shown. Initially, in step 101, a user, such as an information technology (IT) administrator, identifies one or more documents which need to be digitally signed. Documents may also be automatically identified. For example, change-dates of the documents or other signs of modification can be used to identify the documents. Or, the documents may be identified by their inclusion of a reference to a program, project, add-in, etc. that has been updated. In one embodiment, the software embedded in a document may need to be digitally signed in order to allow authentication of the document and any software corresponding to, contained in, or embedded within the document. Each time embedded software is updated, edited, or otherwise changed, all documents having this software embedded therein need to have their embedded software re-signed. In one embodiment, the certificate for generating the digital signatures is specified through user configuration input. In step 102, the user specifies an appropriate certificate which can then be verified. At step 103, the certificate is then accessed one time and used to generate digital signatures for the software embedded in each of the documents. In one embodiment, the certificate is stored in non-volatile memory, such as a hard disk drive. The certificate is read from the non-volatile memory and temporarily stored in cache memory, such as SRAM memory. The certificate is repeatedly accessed from the cache memory to generate digital signatures until all the software and/or documents are digitally signed, as shown in steps 104 and 105. In one embodiment, the certificate and the private key are stored separately. And in step 106, the signing tool generates the results which are reported to the user. Thus, the signing tool can be launched once to sign any number of documents. The user can specify a single, hundreds, or even thousands of documents which need to be signed. The signing tool then automatically generates the digital signatures for signing the software embedded in each of the documents. This highly automated process is much more efficient and less labor intensive than requiring a user to execute a software program to sign a single document and then having the user re-execute that software program to sign another document and then having the user repeatedly execute the software program to separately sign each document on an individual basis. In one embodiment, there is no need to have the software application that created the documents open or running in order for the documents to be signed. In the past, users typically had to sign software embedded in their documents by launching the application the document belongs to, opening the document, then launching the VB Editor, and signing through the editor. This means that only one document can be signed at a time and it required the application to be running on the machine. Rather than signing through an application, one can now sign without the hosting application. This is accomplished through the use of the application library code signing modules of the operating system. These pre-registered modules contain the logic for signing a document format and storing the signature. These modules are used indirectly through calls to operating system cryptography APIs and therefore, it eliminates the need for an originating application to be running or even installed on the machine in order to digitally sign software embedded in documents. Furthermore, in one embodiment, the user interface is implemented as a command-line tool. In other embodiments, a graphical user interface (GUI) tool can be used to facilitate the signing process.

Figure 2:
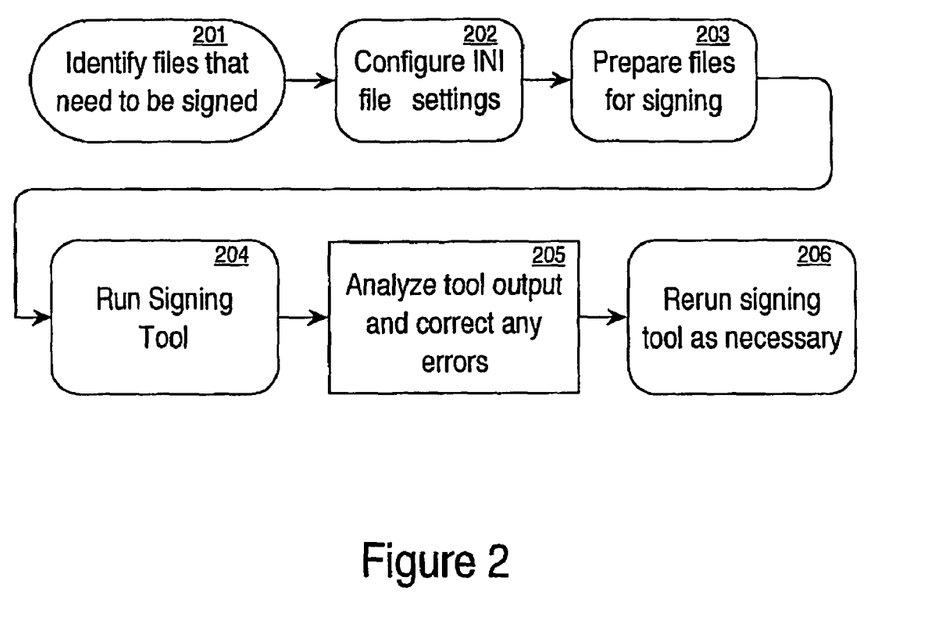
FIG. 2 shows a process flow of one embodiment of a signing tool.

FIG. 2 shows a process flow of one embodiment of a signing tool. According to this process flow, IT administrators use the signing tool to digitally sign or re-sign software (e.g., Visual Basic for Applications™ projects) embedded in a document. The tool can also be used to verify documents or run antivirus scanners on the documents either separately or in conjunction with signing the documents. The signing tool enables an administrator to sign many VBA projects at one time. In process block 201, the documents that need to be signed are identified. This can be accomplished by listing the individual documents and their corresponding paths or by naming a folder. If a folder name is specified, the signing tool traverses the folder and signs all the documents in that particular folder. The documents to be signed can be of any format which is supported by a SIP installed for the operating system. This could include, but is not limited to formats such as .exe, .dll, .xls, .xla, .ppt, .pot, .pps, .ppa, .mpp, .mpt, .pub, .vsd, .vss, .vst, .vdx, .vtx, .vsx, .doc, .dot, .wiz, etc. Furthermore, certificates are not tied to any particular format. Furthermore, it should be noted that the signing tool is not limited to Microsoft Office™ documents, but can be used in conjunction with SIPs to sign executables, including but not limited to .exe and .dll.

In process block 202, the .ini document settings are configured. The .ini document enables administrators to add options or otherwise configure or tailor the operation of the signing tool. For example, an administrator can specify the common name of a valid code-signing certificate (e.g., CertName) in the .ini document. The certificate should be stored on the same computer upon which the signing tool is running. Typically, administrators run the signing tool on their computers, so there should not be any permission or security concerns with accessing the certificates. If this option is selected, the signing tool signs all documents using the certificate with the common name in the certificate store (e.g., the "My" certificate store). Certificates located in other stores, such as "Trust" and "Root," are not supported for use in signing the documents in one embodiment. Alternatively, an administrator can specify the name of a .PFX formatted document. The relative or absolute path to the local computer, to an external drive, or to a UNC path can be specified. It should be noted that one of either a CertName argument or a CertPFXFile argument should be specified, but not both.

The .ini document can also include a Verify argument. This argument indicates that the signing tool should verify whether the signature on the software is valid. If both signing and verification options are selected, the signing operation occurs before the verification so that the new signature is verified. This Verify option can be selected independent of the signing options. In effect, the signing tool can verify signatures on a document; sign and then verify; run antivirus scans and verify that the document is signed successfully (but not sign); or perform all three operations. Running an antivirus scan before signing results in a higher level of confidence in the integrity of the documents being signed. Optionally, a Timestamp argument (e.g., TimestampURL) can specify a time stamp server if an administrator wishes to add a time stamp to the signature. Documents can be signed without a time stamp. If this Timestamp option is selected, the signing tool attempts to use the TimestampURL. If it fails, a timeout is generated and the failed Timestamp operation is noted. Another option entails specifying one or more log files (e.g., Logfile). The results of processing the documents are written to these log files. One log file can contain documents which were processed successfully. Another log file can contain documents which failed to process successfully. In addition, when a folder name is specified, the administrator can specify an option (e.g., Searchsubfolder) indicating whether the signing tool should process documents in subfolders within the specified folder. It should be noted that the signing tool is not limited to the above examples of how the .ini document can be configured.

Once the documents have been properly identified and the .ini document has been set, the signing tool prepares the documents for signing in process block 203, and performs the actual signing in process block 204. These two process blocks 203-204 are responsible for finding the software embedded in the document, extracting it, signing it, and writing the signature of the software back to the document. During operation, the signing tool either copies the documents listed in the specified input document or if a folder name is provided, the signing tool traverses the folder and sub-folders to access and copy the documents. In both cases, the documents are copied from their location to the user's TEMP folder on the computer where the signing tool is running. The documents are then signed and re-copied to the original folder, overwriting the original document, if one exists. When signing a document, the signing tool locks the original document from writing and deleting so other processes cannot access or otherwise change it while the tool processes the temporary local document. The tool releases the lock as it replaces the original document with the temporary document if the signing was successful. The signing tool then deletes the temporary documents. The signing tool uses temporary documents (does not process documents in-place) so as to reduce the risk of corrupting the documents should an error occur during the tool operation.

As the signing tool runs, it displays progress on the console. For example, documents that are successfully processed are displayed in green, documents that generate warning are displayed in yellow, and those that fail processing are displayed in red. The signing tool displays summary information at the end of the run. The results are analyzed and reported back to the administrator in process block 205. The signing tool can optionally include detailed error reporting and error handling functions. Consequently, the administrator has an opportunity to correct errors (if any). The signing tool can be re-run as many times as necessary to sign all of the requisite documents as shown in process block 206. In one embodiment, the success and failure information pertaining to the signing of the embedded software is separated into two log files. Once can easily identify the documents that failed, look through the reasons for failure, and possibly re-run the signing tool based on the information in the failure log file. One can also look through the warnings and decide if they want to re-run the signing tool on the flagged documents.

Figure 3:
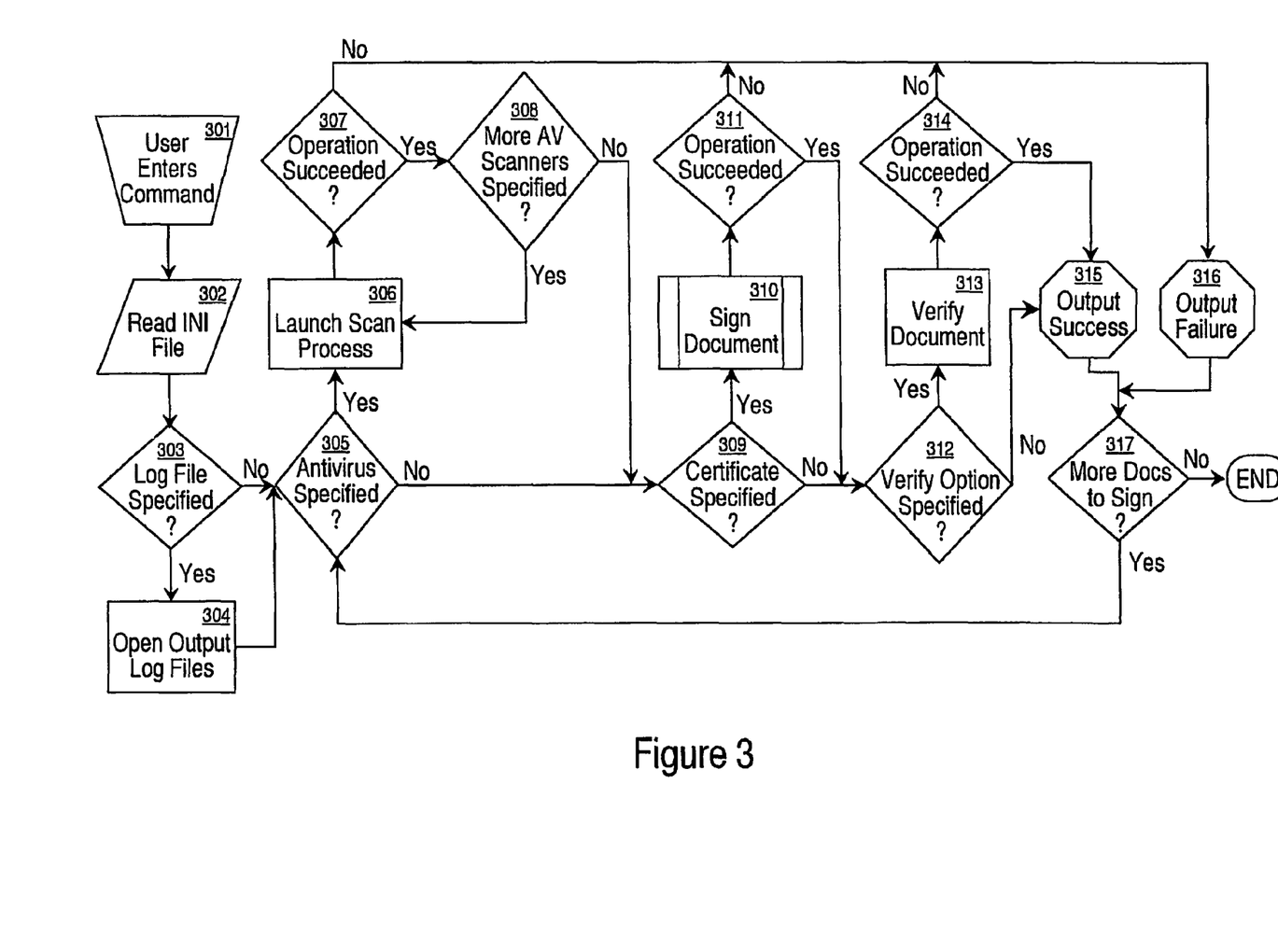
FIG. 3 shows a detailed flowchart of an embodiment of the process flow of a software program for signing multiple documents with embedded executable code.

FIG. 3 is a detailed flowchart of an embodiment of the process flow of a software program for signing multiple documents with embedded executable code. The first step 301 has the user entering a command to launch the software program. When the software program first launches, the process reads the .ini document in step 302. The process determines if a log file is specified in the .ini document in step 303. If a log file was specified, the process opens the output log files in step 304. Otherwise, the process skips step 304 and proceeds directly to step 305. In step 305, the process examines the .ini document to determine whether an antivirus scan was selected. If the user specified antivirus protection, then the process executes steps 306, 307, and 308. Step 306 launches an antivirus scan process. Step 307 determines whether the antivirus scan succeeded. If the antivirus scan did not succeed, the error is logged in an output log file of step 316. Otherwise, the process determines whether any other antivirus scans were specified in the .ini document according to step 308. These other antivirus scans are then executed and any unsuccessful results are logged to the output failure log. Steps 306-308 are repeated until all specified antivirus scans have been executed or a failure is encountered.

Once all antivirus scans have been executed or in the case whereby no antivirus scan was specified, the process proceeds to step 309. Step 309 determines whether a certificate is specified in the .ini document. If a certificate was specified, the document is signed in step 310. As part of step 310, the operating system determines the particular tool or module which is registered to handle the particular document type. For example, if the tool has requested storing a digital signature in a Microsoft PowerPoint™ document, the operating system determines which of the registered modules is designated as processing Microsoft PowerPoint™ documents, and accordingly invokes that particular module. The operating system makes a determination as to whether a registered module has been found to handle the designated document type of the application document. If not, a failure status is returned. Otherwise, the operating system issues a request to determine the hash value for the document. The tool parses the particular application document to determine the location of the embedded portion of code using the appropriate module for the particular format of the document being processed. The tool returns the hash value to the operating system. The operating system constructs a digital signature using the hash value, certificate specified in step 309, and the associated private key. The signing tool stores the signature in the document in accordance with the particular structure format of that document. The tool parses the document and stores the signature in accordance with the document's structured format using the appropriate application-specific library. In one embodiment, a single application library may be utilized in connection with processing all the document types of a particular application program associated with the library.

Next, the process checks in step 311 whether the signing operation was successful. If the signing operation is not successful, this fact is logged in the output failure log of step 316. Otherwise, if the signing was successful or if there was no specified certificate, then the process proceeds to execute step 312. In step 312 a determination is made as to whether the Verify option was specified in the .ini document. If verification was not specified, the process logs a successful signing in the output success log of step 315. However, if the verify option was specified, the process verifies the document in step 313. Thereupon, it checks whether the verification operation succeeded in step 314. A successful verification is logged in the output success log of step 315. An unsuccessful verification is logged in the output failure log of step 316. Upon completion of either step 315 or step 316, the process determines in step 317 whether there are more documents which need to be signed. If there are additional documents to be signed or if the user wishes to verify additional documents, the process proceeds to step 305 and the flow proceeds from step 305 as described above. Otherwise, if no more documents are to be signed or verified, the process ends.

Figure 4:
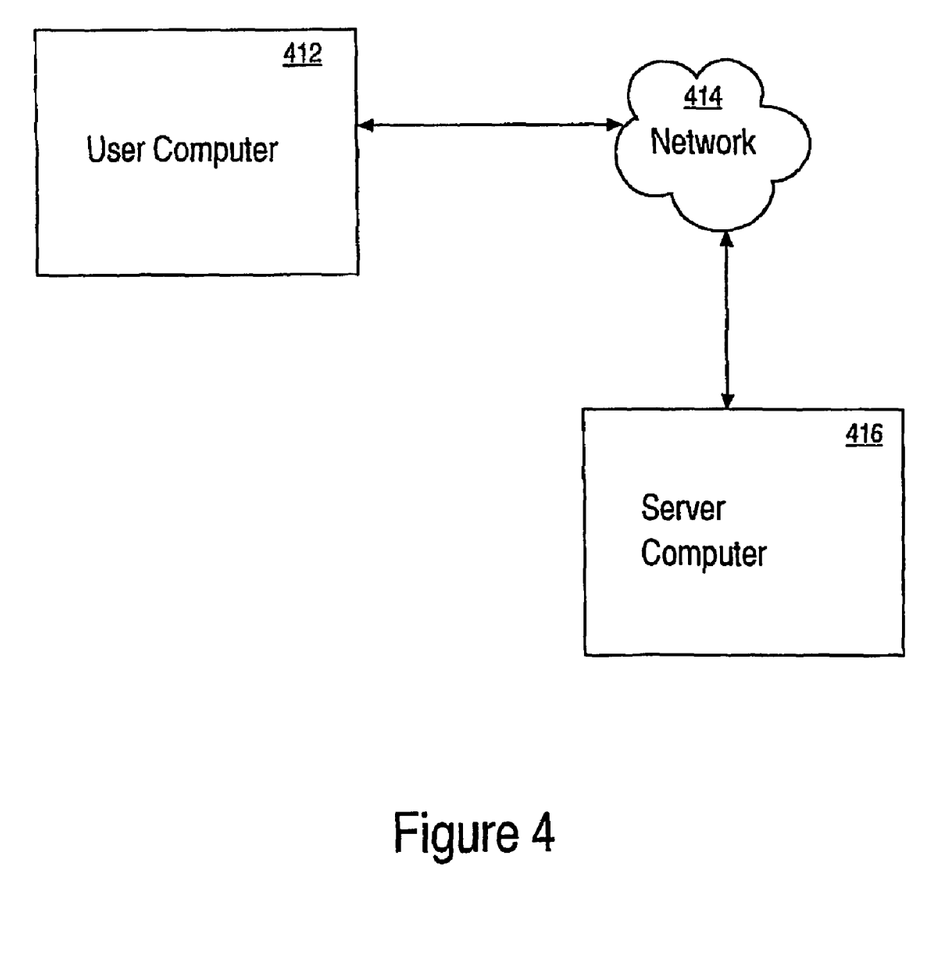
FIG. 4 shows an example of a suitable computing environment in which embodiments utilizing the techniques described herein may be implemented.

Referring now to FIG. 4, an example of a suitable computing environment in which embodiments utilizing the techniques described herein may be implemented is shown. The computing environment illustrated in FIG. 4 is only one example of a suitable computing environment and is not intended to suggest any limitation as to the scope of use or functionality of the techniques described herein. Those skilled in the art will appreciate that the techniques described herein may be suitable for use with other general purpose and specialized purpose computing environments and configurations. Examples of well known computing systems, environments, and/or configurations include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like. The techniques set forth herein may be described in the general context of computer-executable instructions, such as program modules, executed by one or more computers or other devices. Generally, program modules include routines, programs, objects, components, data structures, and the like, that perform particular tasks or implement particular abstract data types. Typically the functionality of the program modules may be combined or distributed as desired in various embodiments.

Included in FIG. 4 are a user computer 412, a network 414, and a server computer 416. The user computer 412 may be a commercially-available computer or a special-purpose computer that may be used to execute one or more program modules. Described in more detail elsewhere herein are program modules that may be executed by the user computer 412. The program modules are used in connection with digital signature and verification techniques to provide a signature for embedded code within an application document in an automated fashion for a variety of different structured document formats. The user computer 412 may operate in a networked environment and communicate with a server computer 416 to perform requests made by the user computer 412. It will be appreciated by those skilled in the art that although the user computer is shown in the example as communicating in a networked environment, the user computer 412 may communicate with other components utilizing different communication mediums. For example, the user computer 412 may communicate with one or more components utilizing a network connection, and/or other type of link known in the art including, but not limited to, the Internet, an intranet, or other wireless and/or hardwired connection(s).

Figure 5:
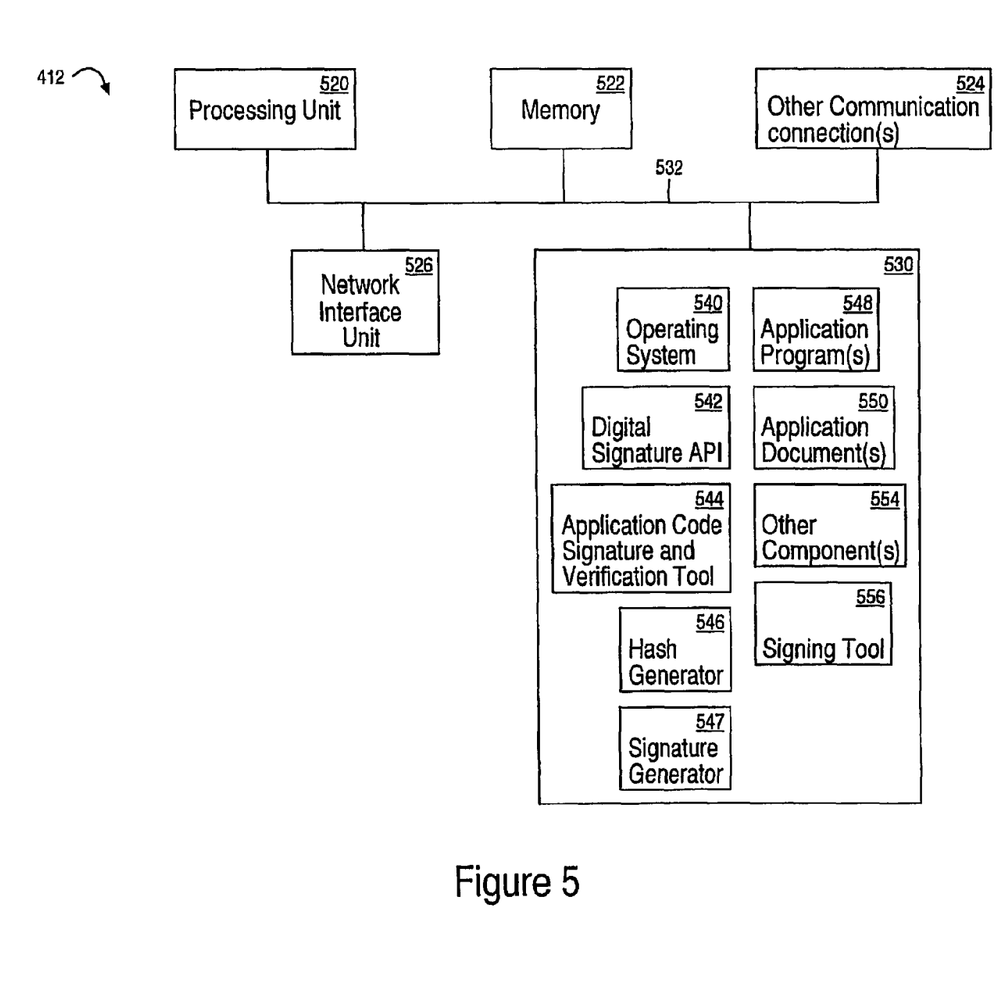
FIG. 5 shows a user computer as may be used in connection with performing the various embodiments of the signing tool.

Referring now to FIG. 5, an example of components that may be included in a user computer 412 as may be used in connection with performing the various embodiments of the techniques described herein is shown. The user computer 412 may include one or more processing units 520, memory 522, a network interface unit 526, storage 530, one or more other communication connections 524, and a system bus 532 used to facilitate communications between the components of the computer 412. Depending on the configuration and type of user computer 412, memory 522 may be volatile (such as RAM), non-volatile (such as ROM, flash memory, etc.) or some combination of the two. Additionally, the user computer 412 may also have additional features/functionality. For example, the user computer 412 may also include additional storage (removable and/or non-removable) including, but not limited to, USB devices, magnetic or optical disks, or tape. Such additional storage is illustrated in FIG. 5 by storage 530. The storage 530 may include one or more removable and non-removable storage devices having associated computer-readable media that may be utilized by the user computer 412. The storage 530 in one embodiment may be a mass-storage device with associated computer-readable media providing non-volatile storage for the user computer 412. Although the description of computer-readable media as illustrated in this example may refer to a mass storage device, such as a hard disk or CD-ROM drive, it will be appreciated by those skilled in the art that the computer-readable media can be any available media that can be accessed by the user computer 412.

By way of example, and not limitation, computer readable media may comprise computer storage media and communication media. Memory 522, as well as storage 530, are examples of computer storage media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by user computer 412. Communication media typically embodies computer readable instructions, data structures, program modules or other data. Combinations of any of the above should also be included within the scope of computer readable media. The user computer 412 may also contain communications connection(s) 524 that allow the user computer to communicate with other devices and components such as, by way of example, input devices and output devices. Input devices may include, for example, a keyboard, mouse, pen, voice input device, touch input device, etc. Output device(s) may include, for example, a display, speakers, printer, and the like. These and other devices are well known in the art and need not be discussed at length here. The one or more communications connection(s) 524 are an example of communication media. In one embodiment, the user computer 412 may operate in a networked environment using logical connections to remote computers through a network. The user computer 412 may connect to the network 414 of FIG. 4 through a network interface unit 526 connected to bus 532. The network interface unit 526 may also be utilized in connection with other types of networks and/or remote systems and components.

One or more program modules and/or data documents may be included in storage 530. During operation of the user computer 412, one or more of these elements included in the storage 530 may also reside in a portion of memory 522, such as, for example, RAM for controlling the operation of the user computer 412. The example of FIG. 5 illustrates various components including an operating system 540, a digital signature API 542, an application code signature and verification tool 544, a hash generator 546, a signature generator 547, one or more application programs 548, one or more application documents 550, a signing tool 556, and other components 554. The ways by which these components operate in conjunction to sign embedded software to perform the steps in the processes shown in the flowcharts of FIGS. 1-3 are described below. The operating system 540 may be any one of a variety of commercially available or proprietary operating system. The operating system 540, for example, may be loaded into memory in connection with controlling operation of the user computer. One or more application programs 548 may execute in the user computer 512 in connection with performing user tasks and operations. It should be noted that although the program modules and/or data documents included in storage 530 are illustrated in this example as being included on user computer 412, an embodiment may also include some or all of these elements in the storage 530 of another computer, such as the server computer 416 which may perform the techniques described herein.

Application documents 550 may be used with particular application programs 548. In one example, an application program may be, for example, a word processing application such as Microsoft Word™ or other Microsoft Office™ application program. The application program may access an application document. The application document may be stored in an application specific document format that may vary with the particular application program. Included within the application document may be a code portion which can executed at any point in time when the document is open for processing by the application program. The code portion included in the document may be, for example, code included in a Visual Basic for Applications, or VBA, project area. The code may be characterized as embedded within the application document for use in connection with performing processing operations on the document by the application program. Depending on the application, code may be generated by the application program as the result of, for example, macro processing operations. A user may also provide code which may be included in the VBA project area.

The techniques described in following paragraphs may be used in connection with locating the particular code portion such as, for example, the VBA project area, of a document, forming a digital signature for the code portion, optionally verifying the digital signature, and then storing the digital signature in the document in accordance with the structure of a particular application's document format. One embodiment of the techniques for digital signature formation and verification is described in more detail in U.S. patent application Ser. No. 11/364,403, filed Feb. 27, 2006, entitled "Techniques for Digital Signature Formation and Verification", which is incorporated by reference herein.

It should be noted that although the techniques described herein store the signature as part of the application document, the signature may be stored elsewhere. Additionally, although specific reference for illustration purposes herein refer to code portions, the techniques described herein may also be used in connection with one or more portions of a structured document format in which each portion may include source code, executable code, scripts including instructions in a human-readable form, and the like, which may be used in connection with the application program associated with the particular structured document format. The examples herein may also refer to Microsoft Office documents but, as will be appreciated by those skilled in the art, may also be used in connection with other documents for digitally signing code portions associated therewith, or for signing document content other than executable code.

The techniques described herein provide for automated formation and/or verification of a digital signature for such code portions without utilizing the application program. In other words, the digital signature may be formed and/or verified without requiring the particular application to be installed on the user computer or other computer, such as the server computer, which may be servicing a request for digital signature formation and/or verification. The digital signature API 542 may include a select set of application programming interfaces or APIs used in connection with digital signature and encryption functionality. In one embodiment, the digital signature API may include an API which, in turn, results in making one or more underlying calls utilizing functionality included in the operating system 540. For example, a digital signature API may result in one or more Win 32 APIs being invoked in an embodiment utilizing a Microsoft Windows™ operating system.

The application code signature and verification tool 544 may be registered with the operating system 540 as the particular tool used to parse and process particular document formats such as, for example, Microsoft Office™ document formats. As will be described in more detail in following paragraphs, one embodiment of the tool 544 is capable of processing a variety of different application document formats associated with Microsoft Office™ applications. The tool searches for a single VBA project in each of the document formats and generates and/or verifies a single digital signature for all of the code included in a single VBA project for an application document. Each of the different application document formats may store the VBA project and/or signature at different locations in accordance with each of the different formats.

The hash generator 546 may be used in connection with generating a hash value for a particular code portion included an application document. It should be noted that in connection with the techniques described herein, any one of a variety of different publicly available or proprietary hash generation techniques may be used in connection with the processing described herein.

The signature generator 547 may be used in connection with generating a digital signature using a hash, such as produced by the hash generator 546, a digital certificate, and a corresponding private key. Any one of a variety of different techniques may be used in connection with generating a digital signature in accordance with a particular hash and digital certificate. In one embodiment, the SHA-1 algorithm may be used to generate a digital signature used in connection with the techniques described herein. The signing tool 556 may be used in connection with forming a digital signature and/or performing verification of the digital signature for one or more application documents in one or more different document formats for various application programs. In other words, the signing tool 556 may be used in connection with forming digital signatures for multiple documents in which each of the documents is in a different structured format. In one embodiment, the signing tool 556, may invoke the application code signature and verification tool 544 in connection with digital signature formation and verification for an application document. In one embodiment, the certificate is stored locally in memory 522. Thereby, rather than having to read the certificate from a remote device or from storage 530, the signing tool 556 accesses memory 522 to obtain the certificate to sign the document. Accessing the certificate from memory 522 is faster than accessing the certificate from storage 530 or from a remote location over a network.

Figure 6:
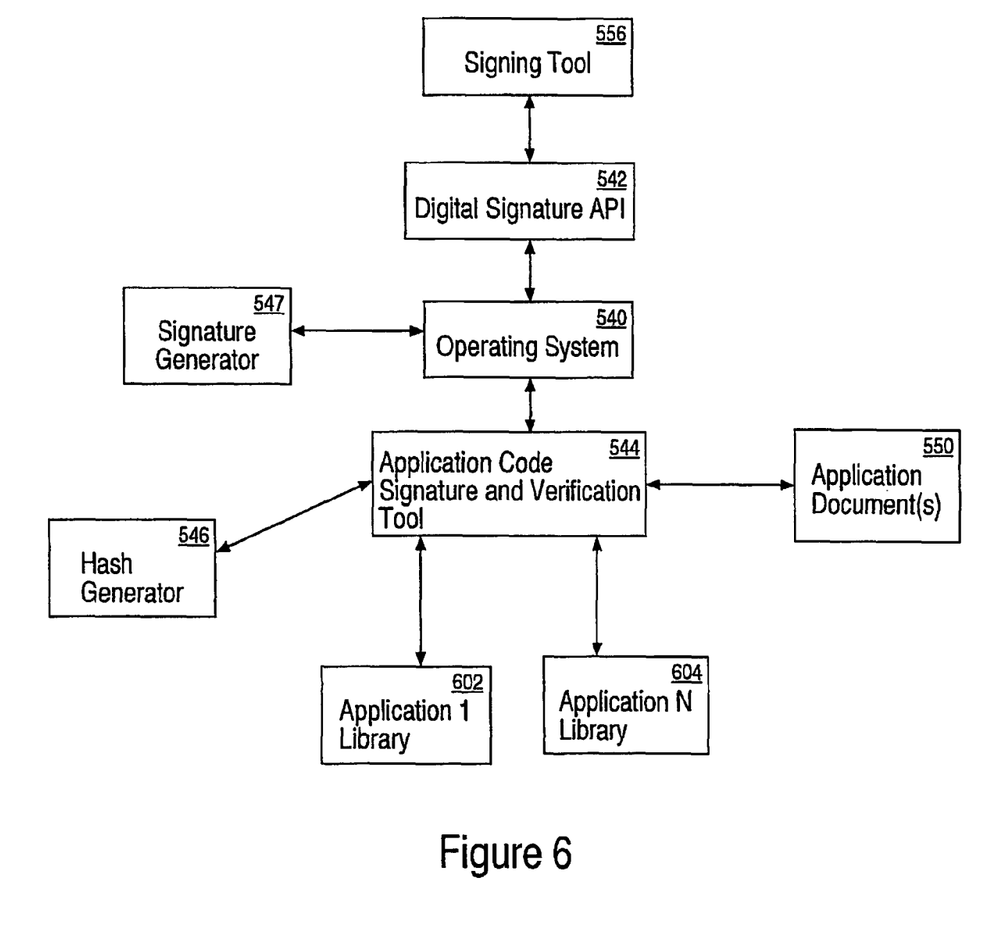
FIG. 6 is a block diagram illustrating how components in one embodiment communicate with each other to facilitate the signing process.

Referring now to FIG. 6, a block diagram illustrating how components in one embodiment communicate with each other in connection with performing the techniques described herein is shown. In particular, the example illustrates how components previously described in connection with FIG. 5 may interact in connection with performing the techniques described herein for signature generation and verification. In one embodiment, the signing tool 556 may utilize one or more APIs included in the digital signature API 542 to form and/or verify a digital signature in connection with one or more application documents. It should be noted that although the tool 544 is shown as accessing the application document 550, one or more other components may also access application documents.

In one embodiment, invocation of a digital signature layer or service 542 may result in invocation of one or more operating system calls such as, for example, one or more calls using the Win32 API, to routines included in the operating system 540. The digital signature layer 542 may be characterized as a software layer used to invoke one or more processing steps to perform a particular operation in connection with digital signature processing. Use of a software layer, such as the digital signature layer 542, facilitates performing a particular task for a calling program, such as the signing tool 556, since the tool may make a single API call resulting in performance of one or more underlying operating system calls. Subsequently, the operating system 540 queries one or more registered modules, each having a predefined interface, to determine which of the registered modules can process a particular document type associated with an application document. In one embodiment, the application code signature and verification tool 544 is registered as capable of processing Microsoft Office™ documents. In an embodiment, each document type may correspond to a different document format or variation of a document format associated with an application.

When the signing tool 556 is processing a Microsoft Office™ document, the operating system 540 interacts with the tool 544 for formation and verification of the digital signature associated with the document. The tool 544 makes calls to application-specific libraries, such as libraries 602 and 604, in connection with parsing and performing processing for the different document formats. In other words, the tool 544 invokes a specific application library for processing application documents in a first format as may be used by a first application program. For example, the tool 544 may utilize application library 602 when processing Microsoft Word™ application documents. The tool 544, may also utilize application library 604, when processing, Microsoft PowerPoint™ application documents. Similarly, there may be a distinct and separate application library for processing application documents utilized by each different application program included in Microsoft Office™. The foregoing use of application-specific libraries provides for modularized coding techniques. It should be noted that in one embodiment, the tool 544 may be implemented as a DLL and the application specific libraries 602, 604 may be included as static libraries therewith. The application specific libraries may include a predefined interface utilized by the tool 544 in connection with parsing the document in accordance with a particular structured format to perform operations on certain portions of the document as well as store information into the document in accordance with the structured format. As described herein, the tool 544 may invoke an application specific library to locate a code portion of a document and for storing a digital signature to the document in accordance with the document's defined structure.

The tool 544 may also interact with the hash generator 546 when determining the hash for a particular code portion, such as a VBA project, included in a document. The tool 544 may communicate the hash value for a particular code portion to the operating system 540 which may, in turn, use the generated hash value and a digital certificate for generating a digital signature by invoking the signature generator 547. Once the digital signature has been formed, the operating system may interact with the tool 544 to store the digital signature in the document. The tool 544 may then utilize the particular application library to store the digital signature in the appropriate location in the particular document format.

Although the subject matter above has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for digitally signing a plurality of files, the method comprising:
   specifying a plurality of files, two or more of the plurality of files comprising embedded software;
   launching a single executable process to digitally sign the embedded software in the plurality of files, wherein a digital signature is accessed once to sign the embedded software in all of the plurality of files, without executing a hosting application for the plurality of files, the single executable process comprising:
      locating the embedded software in one file of the plurality of files;
      specifying a digital certificate which corresponds to the embedded software;
      creating a digital signature according to the digital certificate; and
      signing the embedded software in the one file with the digital signature.

2. The computer-implemented method as recited in claim 1 further comprising:
   verifying at least one digital signature corresponding to said embedded software.

3. The computer-implemented method as recited in claim 1 further comprising:
   running at least one anti-virus scan on at least one of the files.

4. The computer-implemented method as recited in claim 1 further comprising:
   time stamping said plurality of files.

5. The computer-implemented method as recited in claim 1 further comprising:
   logging a first file of the plurality of files in a success log file if the embedded software in the first file is properly digitally signed;
   logging a second file of the plurality of files in a failure log file if the embedded software in the second file is not properly digitally signed.

6. A system for digitally signing a plurality of documents, comprising:
   a processing unit;
   an interface for execution by the processing unit for specifying the plurality of documents, wherein said plurality of documents contains application specific content, and the application specific content comprises embedded software;
   a single executable component which signs said embedded software in a single executable process without requiring that an application which created the documents be installed on the system, by:
      locating the embedded software in the application specific content in one document of the plurality of documents;
      specifying a digital certificate which corresponds to the embedded software;
      creating a digital signature according to the digital certificate; and
      signing the embedded software in the application specific content in the one document with the digital signature.

7. The system of claim 6, wherein the interface comprises a command-line interface.

8. The system of claim 6, wherein an application associated with a document need not be running for the embedded software in the document to be signed.

9. The system of claim 6 further comprising memory for storing a success log and a failure log, wherein the success log stores successful results of embedded software which has been signed and the failure log stores unsuccessful results of embedded software which was not properly signed.

10. The system of claim 6 further comprising a virus checker for checking the documents for viruses.

11. The system of claim 6 further comprising a verification component which verifies signatures corresponding to the embedded software.

12. A method for protecting software embedded in documents from unauthorized changes, comprising the steps of:
   specifying the documents to be protected;
   locating the software embedded in the documents;
   specifying a certificate for digitally signing the located software;
   accessing the certificate;
   executing a single process through a command-line interface which applies the certificate to digitally sign all of the software embedded in the documents, and wherein an application program which created a document is not required to be open and running in order for the software embedded in the document to be digitally signed.

13. The method as recited in claim 12 further comprising the step of:
   initiating an anti-virus scan on the documents.

14. The method as recited in claim 12 further comprising the steps of:
   copying the documents to a temporary location;

signing the software embedded in the documents when the documents are stored in the temporary location;

storing the documents comprising signed embedded software back to an original location.

15. The method as recited in claim 12 further comprising the step of verifying the documents, wherein the verifying is accomplished as part of executing the single process.

16. The method as recited in claim 12 further comprising the step of specifying the documents by identifying a folder containing the documents that correspond to locations of the documents.

17. A method for generating a plurality of digital signatures comprising:

storing a certificate in a non-volatile memory;
reading the certificate from non-volatile memory;
caching the certificate in a temporary location;
accessing the certificate from the temporary location to generate the plurality of digital signatures; and
executing a single process to digitally sign software embedded in a plurality of files using the plurality of digital signatures, without executing a hosting application for the plurality of files.

* * * * *